United States Patent Office 3,542,861
Patented Nov. 24, 1970

---

3,542,861
3-AMINO-5-CYCLOALKYLCARBONYLAMINO-2,4,6-TRIIODOBENZOIC ACIDS
James H. Ackerman, Bethlehem, N.Y., assignor to Sterling Drug Inc., New York, N.Y., a corporation of Delaware
No Drawing. Continuation-in-part of application Ser. No. 550,605, May 17, 1966. This application Mar. 15, 1968, Ser. No. 713,302
Claims priority, application Great Britain, May 8, 1967, 21,362/67
Int. Cl. C07c 103/86
U.S. Cl. 260—518                                3 Claims

---

ABSTRACT OF THE DISCLOSURE

Bis(3-carbonylamino-2,4,6-triiodo-5-substituted-benzoic acids) bridged at the 3-position by an oxygen or sulfur interrupted alkylene chain, useful as intravenous cholecystographic agents, are prepared by reaction of a 3-amino-5-substituted-2,4,6-triiodobenzoic acid with the appropriate dibasic acid dihalide.

---

This application is a continuation-in-part of my prior copending application, Ser. No. 550,605, filed May 17, 1966, now abandoned.

This invention relates to new iodinated organic acids and derivatives thereof, and to their preparation. More particularly, the invention is concerned with bis(3-carbonyl - amino - 2,4,6-triiodo-5-substituted-benzoic acids) bridged at the 3-position by an oxygen or sulfur interrupted alkylene chain, with salts and esters thereof, and with methods for their preparation.

The invention sought to be patented resides in the concept of a composition of matter having a molecular structure wherein two 3-carbonylamino-2,4,6-triiodo-benzoic acid moieties substituted in the 5-position by a substituted amino or carbamyl group are linked together at the respective 3-positions by an oxygen or sulfur interrupted alkylene bridge. The invention also includes esters and salts of said acid moieties, and certain novel intermediates in the preparation thereof.

The preferred aspect of the invention comprises compounds of the following general formula

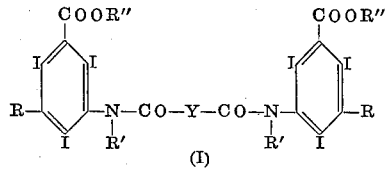

(I)

wherein R is H$_2$N, (lower-alkanoyl)NH, (lower-alkanoyl)$_2$N, (lower-alkanoyl)N(lower-alkyl), (lower-alkoxy - lower - alkanoyl)NH, (lower - alkoxy-lower-alkanoyl)N(lower-alkyl), (cycloalkylcarbonyl)NH, (cycloalkylcarbonyl)N(lower - alkyl), (lower-alkyl)NHCO, (lower-alkyl)$_2$NCO, or (lower-alkyl)$_2$NCH=N; R' is hydrogen or lower-alkyl; R" is hydrogen or lower-alkyl; and Y is an alkylene bridge having from two to eight carbon atoms and interrupted by from one to three members selected from O, S, SO and SO$_2$, said members, when more than one, being separated by at least two carbon atoms.

In the groups which R represents, the lower-alkanoyl groups have from one to six carbon atoms, thus including formyl, acetyl, propionyl, butyryl, isobutyryl, valeryl, caproyl and the like; and can, if desired, be interrupted by oxygen atoms, thus also including such groups as methoxyacetyl, β-ethoxypropionyl, and the like.

The term lower-alkyl, used in defining R' and R" and in the groups which R represents, stands for alkyl groups having from one to six carbon atoms, thus including methyl, ethyl, propyl, isopropyl, butyl, isobutyl, pentyl, hexyl, and the like.

When R stands for (lower-alkoxy-lower-alkanoyl)NH or (lower - alkoxy - lower-alkanoyl)N(lower-alkyl), the lower-alkoxy groups have from one to four carbon atoms and thus include, for example, methoxy, ethoxy, propoxy, isopropoxy, butoxy, and the like.

When R stands for (cycloalkylcarbonyl)NH or (cycloalkylcarbonyl)N(lower-alkyl), the cycloalkyl groups have from three to six ring members and thus include, for example, cyclopropyl, cyclobutyl, cyclopentyl, cyclohexyl and lower-alkylated derivatives thereof.

A particularly preferred aspect of the invention resides in compounds of the fomula

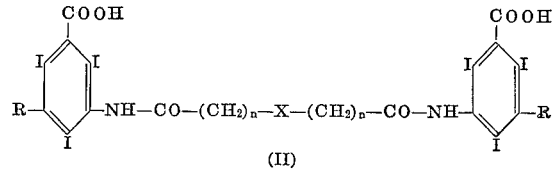

(II)

wherein R is (lower-alkanoyl)N(lower-alkyl), X is O, S, SO or SO$_2$ and $n$ is an integer from 1 to 4.

The compounds of the invention can be prepared by the following general methods:

(A) FROM 3-AMINO-5-R-2,4,6-TRIIODOBENZOIC ACID

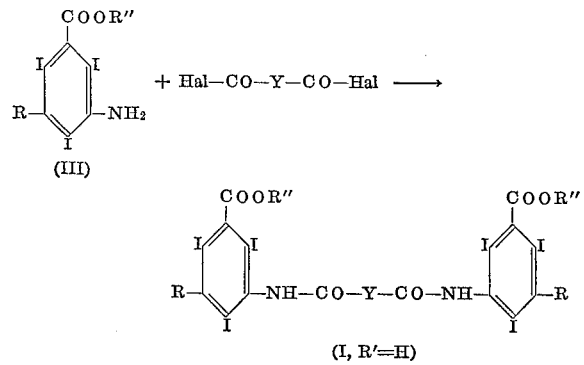

(I, R'=H)

The starting materials of Formula III, except those where R is (cycloalkylcarbonyl)NH or (cycloalkylcarbonyl)N(lower-alkyl) belong to known classes of compounds, readily prepared from 3-amino-5-aminobenzoic acid by conventional methods. The compounds of Formula III where R is (cycloalkycarbonyl)NH or cycloalkylcarbonyl)N(lower-alkyl) are novel and are within the purview of the present invention.

According to the present invention, a 3-amino-5-R-2,4,6-triiodobenzoic acid or an ester thereof (III), where R is (lower-alkanoyl)NH, (lower-alkanoyl)N(lower-alkyl), (lower-alkoxy-lower-alkanoyl)NH, (lower-alkoxy-lower-alkanoyl)N(lower-alkyl), (cycloalkylcarbonyl)NH, (cycloalkylcarbonyl)N(lower - alkyl), (lower - alkyl)-NHCO, or (lower-alkyl)$_2$NCO, is reacted with a diacid halide, Hal-CO-Y-CO-Hal, where Hal is middle halogen (chlorine or bromine), to yield a compound of Formula I where R' is hydrogen. The reaction is preferably carried out by heating the reactants in an inert solvent at temperature between about 80° C. and 150° C. Examples of inert solvents include dioxane, dimethylformamide and dimethylacetamide. Dioxane is an especially preferred solvent.

The compounds of Formula I where R' is lower-alkyl are prepared by an alkylation step, that is by reaction of the compounds where R' is hydrogen with a lower-alkyl sulfate, alkanesulfonate, arenesulfonate or halide (preferably chloride, bromide, iodide) under alkaline conditions.

(B) FROM 3-AMINO-5-NITROBENZOIC ACID

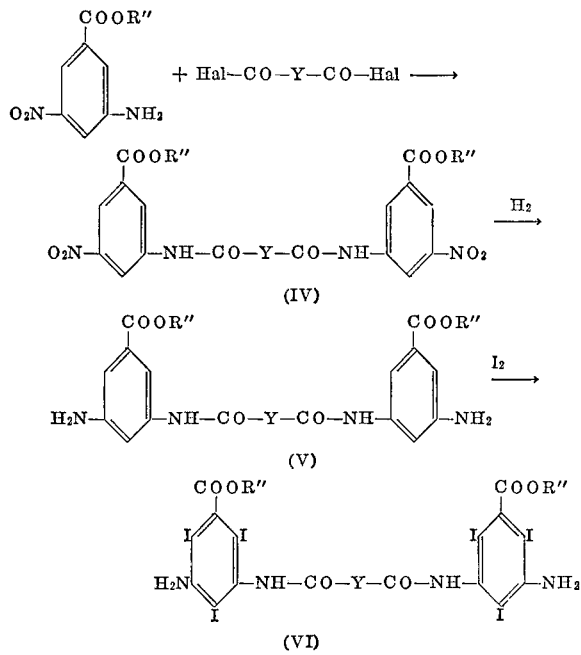

According to the invention, 3-amino-5-nitrobenzoic acid or an ester thereof is reacted with a diacid halide, Hal—CO—Y—CO—Hal, where X is middle halogen (chlorine or bromine), to yield a bis amide (IV). Hydrogenation of the latter reduces the nitro groups to amino groups, and the resulting compound of Formula V is then iodinated to give the intermediate of Formula VI. A compound of Formula VI can be acylated with an alkanoic, alkoxyalkanoic or cycloalkane-carboxylic acid anhydride or halide to give a compound of Formula I where R is (lower-alkanoyl)NH, (lower-alkoxy-lower-alkanoyl)NH, (cycloalkylcarbonyl)NH or (lower-alkanoyl)$_2$N and R' is hydrogen, which can then, if desired be alkylated with a lower-alkyl sulfate, sulfonate or halide to give a compound of Formula I where R is (lower-alkanoyl)N(lower-alkyl), (lower - alkoxy-lower-alkanoyl)N(lower-alkyl), or (cycloalkylcarbonyl)N-(lower-alkyl), and R' is lower-alkyl. Alternatively, a compound of Formula VI can be dialkylated with a lower-alkyl sulfate, sulfonate or halide, followed by acylation to give a compound of Formula 1 where R is, lower-alkanoyl)NH, (lower-alkoxy-lower-alkanoyl)NH, (cycloalkylcarbonyl)NH, or (lower-alkanoyl)$_2$N and R' is lower-alkyl. A compound of Formula VI can also be reacted with a di-lower-alkylformamide in the presence of phosphorus oxychloride, preferably with prior alkylation on the amide nitrogens, to give a compound of Formula I where R is (lower-alkyl)$_2$NCH=N and R' is H or lower-alkyl.

The compounds of Formula II where X is SO or SO$_2$ can alternatively be prepared by oxidation of the corresponding compounds of Formula II where X is S with a peracid. The reaction takes place at room temperature in an inert organic solvent.

The structures of the compounds of the invention were established by the modes of synthesis, by elementary analysis and spectral determinations. The progress of the reactions was followed by thin layer chromatography.

The invention contemplates compounds of Formula I where R" is hydrogen either in the form of the free acids or in the form of salts derived from inorganic bases or organic amines. Preferred types of salts are those having pharmacologically acceptable cations, e.g., the sodium, calcium, magnesium or N-methylglucamine salts, although all types of salts, including those having toxic cations are within the purview of the invention because they are useful as intermediates or as characterizing derivatives for the free acids. The salt forms of the compounds of the invention are considered the full equivalents of the free acids claimed herein.

The compounds of Formula I where R" is hydrogen, in the form of their water-soluble, pharmacologically acceptable salts, have been found to be excellent X-ray contrast agents for visualization of the gallbladder upon intravenous injection. They possess low intravenous toxicity, LD$_{50}$ values ranging from 3000 to 19,000 mg./kg. in mice. The particularly preferred compounds, represented by Formula II above, have LD$_{50}$ values ranging from 9000 to 19,000 mg./kg. as compared with values of 3070 and 5300 mg./kg., respectively, for the known commercially avialable intravenous cholecystographic agents, N,N'-bis(3 - carboxy - 2,4,6 - triiodophenyl)adipamide (iodipamide) and 3,3' - (diglycoloyldiimino)bis(2,4,6-triiodobenzoic acid) (ioglycamide).

The actual quantitative determination of toxicity and radiopaque effectiveness for a particular compound is readily determined by standard test procedures by technicians trained in pharmacological test procedures, without the need for any extensive experimentation. The compounds were tested for their intravenous cholecystographic efficacy by standard procedure as follows: The test compound was injected intravenously in the form of an aqueous solution of the sodium or N-methylglucamine salt to cats. Each cat was X-rayed at hourly intervals and the roentgenograms examined and evaluated. The density of the gallbladder shadows was interpreted in accordance with a numerical scoring plan designated as the Cholecystographic Index (CI), a measure of the efficiency of the test compound, viz.: 0 (none), 1 (poor), 2 (fair), 3 (good), 4 (excellent) [see J. O. Hoppe, J. Am. Pharm. Assoc., Sci. Ed. 48, 368–79 (1959)]. The compounds of the present invention have a favorable bile/urine ratio and maximum Cholecystographic Index values ranging from 3.0 to 4.0 at a dose level of 100 mg./kg.

The compounds of the invention are prepared for use by dissolving a pharmaceutically acceptable salt form in sterile aqueous medium suitable for intravenous injection.

The ester compounds of Formula I (R" is lower-alkyl) are useful either as intermediates in the preparation of the corresponding acids (R" is hydrogen), or as radiopaque agents for visualization of body cavities by direct injection therein, e.g., in bronchographical procedures.

The following examples will further illustrate the invention without the latter being limited thereby.

EXAMPLE 1

3,3' - [(3,3' - thiodipropionyl)diimino]bis[2,4,6 - triiodo-5-(N-methylacetamido)benzoic acid] [II; R is (CH$_3$CO)N(CH$_3$)—, X is S, $n$ is 2]

A mixture of 29.3 g. of 3-amino-5-(N - methylacetamido) - 2,4,6 - triiodobenzoic acid [M.P. 249.0–249.5° C. (dec.)] and 5.38 g. of 3,3'-thiodipropionyl chloride in 150 ml. of pure dioxane was refluxed for three days. The reaction mixture was cooled, and the solid product (17.3 g.) collected by filtration, suspended in 100 ml. of absolute methanol and 26 ml. of 1 N sodium hydroxide in methanol added. The resulting solution was treated with activated charcoal, filtered, and the filtrate added dropwise to 1.5 liter of absolute ether with stirring. The suspension was stirred for 30 minutes, the solid collected and dissolved in 100 ml. of methanol, and the solution treated with activated charcoal and filtered. The filtrate was added to 1 liter of chloroform with stirring, and the solid product collected and dried for three days at 85° C. (0.2 mm.)

to give 3,3′ - [(3,3′-thiodipropionyl)diimino]bis[2,4,6-triiodo-5-(N-methylacetamido)-benzoic acid] in the form of its disodium salt, M.P. 238–245° C. (dec.).

A solution of the latter disodium salt in water was acidified with 3 N hydrochloric acid, the suspension stirred for 30 minutes, and the solid product collected, washed with distilled water and dried to constant weight in vacuo at 100–130° C. There was thus obtained 3,3′-[(3,3′ - thiodipropionyl) - diimino]bis[2,4,6 - triiodo - 5 - (N-methylacetamido)benzoic acid], M.P. 265.0–271.0° C. (dec.).

3,3′ - [(3,3′ - thiodipropionyl)diimino]bis[2,4,6 - triiodo-5-(N-methylacetamido)benzoic acid] can be treated with calcium hydroxide, magnesium hydroxide or N-methylglucamine to give, respectively, the calcium, magnesium or di-(N-methylglucamine) salts.

EXAMPLE 2

3,3′ - [(3,3′ - thiodipropionyl)diimino]bis[2,4,6 -triiodo-5-(N-ethylacetamido)benzoic acid] [II; R is $(CH_3CO)N(C_2H_5)$—, X is S, $n$ is 2]

3 - amino - 5 - (N - ethylacetamido) - 2,4,6 - triiodobenzoic acid [60 g., M.P. 259.0–260.0° C. (dec.)] was dissolved in 800 ml. of pure dioxane, and 250 ml. of the dioxane was distilled off to remove residual moisture. 3,3′-thiodipropionyl chloride (10.75 g.) was then added, and the mixture was refluxed under anhydrous conditions until evolution of hydrogen chloride ceased (about five days). The reaction mixture was distilled to remove 300 ml. of dioxane, then cooled, and the solid product (35 g.) collected by filtration. The solid was dissolved in dilute sodium hydroxide (about 150 ml.), 5 ml. of ethanol added, the solution treated with activated charcoal, filtered, and acidified with 3 N hydrochloric acid. The product was collected, washed with 10% acetic acid solution and dried to constant weight in vacuo at 100–130° C. to give 3,3′ - [(3,3′ - thiodipropionyl)diimino]bis[2,4,6-triiodo-5-(N-ethylacetamido)benzoic acid], M.P. 243–244° C. (dec.).

EXAMPLE 3

3,3′ - [(thiodiacetyl)diimino]bis[2,4,6 - triiodo - 5 - (N-ethylacetamido)benzoic acid] [II; R is $(CH_3CO)N(C_2H_5)$—

X is S, $n$ is 1] was prepared from 42.89 g. of 3-amino-5-(N-ethylacetamido)-2,4,6-triiodobenzoic acid and 6.69 g. of thiodiacetyl chloride in 350 ml. of dioxane according to the procedure described above in Example 2, and was obtained in the form of a colorless solid, M.P. 256–258° C. (dec.).

EXAMPLE 4

3,3′ - (diglycolyldiimino)bis[2,4,6 - triiodo-5-(N-methylacetamido)benzoic acid] [II; R is $(CH_3CO)N(CH_3)$—, X is O, $n$ is 1]

A mixture of 46.9 g. of 3-amino-5-(N-methylacetamido)-2,4,6-triiodobenzoic acid and 6.84 g. of diglycolyl chloride in 200 ml. of dioxane was refluxed until evolution of hydrogen chloride ceased (about 24 hours). The reaction mixture was cooled and the solid which separated was collected and dissolved in dilute sodium hydroxide, and the solution filtered and acidified slowly with dilute hydrochloric acid. The product was collected and dried in vacuo at 100–135° C. to give 3,3′-(diglycolyldiimino)bis[2,4,6-triiodo-5-(N - methylacetamido)benzoic acid], M.P. 270.8–272.6° C. (dec.).

EXAMPLE 5

3,3′ - [(thiodiacetyl)diimino]bis[2,4,6 - triiodo - 5 - (N-methylacetamido)benzoic acid] [II; R is $(CH_3CO)N(CH_3)$—

X is S, $n$ is 1] was prepared from 29.3 g. of 3-amino-5-(N-methylacetamido)-2,4,6-triiodobenzoic acid and 4.68 g. of thiodiacetyl chloride in 200 ml. of dioxane according to the procedure described above in Example 1. The product was obtained first in the form of the disodium salt, M.P. 273.0–273.5° C. (dec.), and then as the free acid, M.P. 247–256° C. (dec.).

EXAMPLE 6

5,5′ - [(3,3′ - thiodipropionyl)diimino]bis[2,4,6 - triiodo-N-methylisophthalamic acid] [I; R is $CH_3NHCO$—, R′ and R″ are H, Y is $CH_2CH_2SCH_2CH_2$] was prepared from 57.2 g. of 5-amino-2,4,6-triiodo-N-methylisophthalamic acid [M.P. 265.4–266.4° C. (dec.)] and 10.76 g. of 3,3′-thiodipropionyl chloride in 700 ml. of dioxane, refluxed until evolution of hydrogen chloride ceased. The solid product was dissolved in isopropyl alcohol and neutralized with ammonium hydroxide. The mixture was distilled until the water was removed and the resulting solid collected to give 58.2 g. of 5,5′-[(3,3′-thiodipropionyl)diimino]bis[2,4,6-triiodo - N - methylisophthalamic acid] in the form of its diammonium salt, M.P. 258° C. (dec.). The latter was converted to the free acid, M.P. 265° C. (dec.).

EXAMPLE 7

3,3′ - [(3,3′ - thiodipropionyl)diimino]bis[2,4,6 - triiodo-5-(N-methylpropionamido)benzoic acid] [II; R is $(CH_3CH_2CO)N(CH_3)$—, X is S, $n$ is 2] was prepared from 60 g. of 3-amino-5-(N-methylpropionamido)-2,4,6-triiodobenzoic acid [M.P. 247° C. (dec.)] and 10.75 g. of 3,3′-thiodipropionyl chloride in 700 ml. of dioxane. The product was converted to its diammonium salt in isopropyl alcohol and then acidified to the free acid to give 3,3′ - [3,3′ - thiodipropionyl)diimino]bis[2,4,6-triiodo-5-(N - methylpropionamido)benzoic acid], M.P. 254° C. (dec.).

EXAMPLE 8

3,3′ - [(3,3′ - thiodipropionyl)diimino]bis[2,4,6 - triiodo-5-(N-methylbutyramido)benzoic acid] [II; R is $(CH_3CH_2CH_2CO)N(CH_3)$—, X is S, $n$ is 2] was prepared from 43 g. of 3-amino-5-(N-methylbutyramido)-2,4,6-triiodobenzoic acid [M.P. 249.0–249.5° C. (dec.)] and 7.54 g. of 3,3′-thiodipropionyl chloride in 350 ml. of dioxane, and was obtained in the form of a colorless solid, M.P. 241–245° C. (dec.).

EXAMPLE 9

3,3′ - [(3,3′ - thiodipropionyl)diimino]bis[2,4,6-triiodo-5-(N-butylacetamido)benzoic acid] [II; R is $(CH_3CO)N(C_4H_9)$—

X is S, $n$ is 2] was prepared from 42.4 g. of 3-amino-5-(N - butylacetamido) - 2,4,6 - triiodobenzoic acid [M.P. 152.0–175.0° C.; sodium salt M.P. 225.0–233.0° C. (dec.)] and 7.25 g. of 3,3′-thiodipropionyl chloride in 250 ml. of dioxane, and was obtained in the form of a colorless solid, M.P. 236–237° C. (dec.).

EXAMPLE 10

3,3′ - [(3,3′ - thiodipropionyl)diimino]bis[2,4,6-triiodo-5-(N-propylacetamido)benzoic acid] [II; R is $(CH_3CO)N(C_3H_7)$—

X is S, $n$ is 2] was prepared from 50 g. of 3-amino-5-(N-propylacetamido)-2,4,6-triiodobenzoic acid [M.P. 255° C. (dec.)] and 8.76 g. of 3,3′-thiodipropionyl chloride in 220 ml. of dioxane, and was obtained in the form of a colorless solid, M.P. 252° C. (dec.).

According to the methods described hereinabove, 3,3′-thiodipropionyl chloride can be caused to react with 3 - amino - 5 - acetamido-2,4,6-triiodobenzoic acid, ethyl 3 - amino - 5-(N-methylacetamido)-2,4,6-triiodobenzoate, 5-amino-2,4,6-triiodo-N,N-dimethylisophthalamic acid, or 3 - amino-5-(methoxyacetamido)-2,4,6-triiodobenzoic acid to give, respectively, 3,3′-[(3,3′-thiodipropionyl)diimino] bis[2,4,6-triiodo-5-acetamidobenzoic acid] [I; R is $CH_3CONH$—

R' and R" are H, Y is CH₂CH₂SCH₂CH₂], diethyl 3,3'-[(3,3' - thiodipropionyl)diimino]bis[2,4,6 - triiodo-5-(N-methylacetamido)benzoate] [I; R is (CH₃CO)N(CH₃)—

R' is H, R" is C₂H₅, Y is CH₂CH₂SCH₂CH₂], 5,5'-[(3,3'-thiodipropionyl)diimino]bis[2,4,6 - triiodo-N,N-dimethylisophthalamic acid] [I; R is (CH₃)₂NCO—, R' and R" are H, Y is CH₂CH₂SCH₂CH₂], or 3,3'-[(3,3'-thiodipropionyl)diimino]bis[2,4,6 - triiodo-5-(methoxyacetamido)benzoic acid] [I; R is (CH₃OCH₂CO)NH, R' and R" are H, Y is CH₂CH₂SCH₂CH₂].

According to the foregoing procedures, 3-amino-5-(N-methylacetamido)-2,4,6-triiodobenzoic acid can be caused to react with Cl—COCH₂CH₂CH₂SCH₂CH₂CH₂CH₂CO—Cl Cl—COCH₂CH(CH₃)SCH(CH₃)CH₂CO—Cl Cl—COCH₂OCH₂CH₂OCH₂CO—Cl Cl—COCH₂SCH₂CH₂SCH₂CO—Cl or Cl—COCH₂OCH₂CH₂SCH₂CO—Cl to give, respectively, 3,3' - [(5,5' - thiodivaleryl)diimino]bis[2,4,6 - triiodo - 5 - (N-methylacetamido)benzoic acid] (II; R is (CH₃CO)N(CH₃)—, X is S, n is 4] 3,3'-[(3,3'-thiodibutyryl)diimino]bis[2,4,6 - triiodo-5-(N-methylacetamido)benzoic acid] [I; R is (CH₃CO)N(CH₃)—, R' and R" are H, Y is CH₂CH(CH₃)SCH(CH₃)CH₂], N,N'-bis-[3 - (N - methylacetamido) - 5-carboxy-2,4,6-triiodophenyl]-3',6'-dioxasuberamide [I; R is (CH₃CO)N(CH₃)—, R' and R" are H, Y is CH₂OCH₂CH₂OCH₂], N,N'-bis-[3 - (N - methylacetamido) - 5-carboxy-2,4,6-triiodophenyl]-3',6'-dithiasuberamide [I; R is (CH₃CO)N(CH₃)—, R' and R" are H, Y is CH₂SCH₂CH₂SCH₂], or N,N'-bis-[3 - (N - methylacetamido) - 5-carboxy-2,4,6-triiodophenyl]-3'-oxa-6'-thiasuberamide [I; R is (CH₃CO)N(CH₃)—, R' and R" are H, Y is CH₂OCH₂CH₂SCH₂].

EXAMPLE 11

3,3' - [(3,3' - thiodipropionyl) - N,N'-dimethyldiimino]bis[2,4,6-triiodo-5-(N-methylacetamido)benzoic acid] [I; R is (CH₃CO)N(CH₃)—, R' is CH₃, R" is H, Y is CH₂CH₂SCH₂CH₂] can be prepared by dissolving 3,3'-[(3,3' - thiodipropionyl)diimino]bis[2,4,6 - triiodo - 5-(N-methylacetamido)benzoic acid] (Example 1) in dilute sodium hydroxide and adding during 15 minutes a solution of an excess of dimethyl sulfate in acetone, followed by stirring at room temperature for several hours. The product can be obtained by acidification of the reaction mixture and collection of the precipitated solid.

EXAMPLE 12

(a) 3,3' - [(3,3' - thiodipropionyl)diimino]bis(5-nitrobenzoic acid) [IV; R" is H, Y is CH₂CH₂SCH₂CH₂] can be prepared by reacting 3-amino-5-nitrobenzoic acid with 3,3'-thiodipropionyl chloride according to the procedure described above in Example 6.

(b) 3,3' - [3,3' - thiodipropionyl)diimino]bis(5-aminobenzoic acid) [V; R" is H, Y is CH₂CH₂SCH₂CH₂] can be prepared by gradually adding Raney nickel catalyst to a suspension of 3,3' - [(3,3' - thiodipropionyl)diimino]bis(5-nitrobenzoic acid) in a dilute aqueous solution of hydrazine hydrate until frothing ceases. The mixture is heated for one hour and filtered, and the filtrate acidified with acetic acid. The product is collected by filtration.

(c) 3,3' - [(3,3'-thiodipropionyl)diimino]bis(5-amino-2,4,6-triiodobenzoic acid) [VI; R" is H, Y is

CH₂CH₂SCH₂CH₂]

can be prepared by stirring a mixture of 3,3'-[3,3'-thiodipropionyl)diimino]bis(5-aminobenzoic acid) and an excess of potassium iododichloride in distilled water at room temperature for sixteen hours. The product is collected by filtration and purified through the diammonium or disodium salt.

(d) 3,3' - [(3,3' - thiodipropionyl) - N,N' - dimethyldiimino]bis(5-amino-2,4,6-triiodobenzoic acid) can be prepared 3,3' - [(3,3' - thiodipropionyl) - N,N'-dimethyldiimino](5-amino-2,4,6-triiodobenzoic acid) with dimethyl sulfate according to the procedure described above in Example 11.

(e) 3,3' - [(3,3' - thiodipropionyl) - N,N' - dimethyldiimino]bis(2,4,6-triiodo-5-acetamidobenzoic acid) [I; R is CH₃CONH, R' is CH₃, R" is H, Y is

CH₂CH₂SCH₂CH₂]

can be prepared by heating at 100° C. for eight hours a mixture of 3,3' - [(3,3'-thiodipropionyl)-N,N'-dimethyldiimino]bis(5-amino-2,4,6-triiodobenzoic acid) and an excess of acetic anhydride containing a few drops of concentrated sulfuric acid. The product is collected and purified through its diammonium or disodium salt. If the reaction mixture is heated at reflux (140° C.) instead of at 100° C. there can be obtained 3,3'-[(3,3'-thiodipropionyl)-N,N'-dimethyldiimino]bis(2,4,6 - triiodo - 5-diacetylaminobenzoic acid) [I; R is (CH₃CO)₂N, R' is CH₃, R" is H, Y is CH₂CH₂SCH₂CH₂].

EXAMPLE 13

3,3' - [(3,3' - thiodipropionyl)-N,N'-dimethyldiimino]-bis[2,4,6 - triiodo - 5-(dimethylaminomethylenamino)benzoic acid] [I; R is (CH₃)₂NCH=N, R' is CH₃, R" is H, Y is CH₂CH₂SCH₂CH₂] can be prepared by adding phosphorus oxychloride to a cooled solution of 3,3'-[(3,3'-thiodipropionyl) - N,N' - dimethyldiimino]bis(5 - amino-2,4,6-triiodobenzoic acid) and an excess of dimethylformamide in chloroform.

EXAMPLE 14

3,3'-[(3,3'-sulfonyldipropionyl)diimino]bis[2,4,6-triiodo-5 - (N-methylacetamido)benzoic acid] [II; R is (CH₃CO)N(CH₃)—, X is SO₂, n is 2]

A mixture of 278 g. (0.470 mole) of 3-amino-5-(N-methylacetamido)-2,4,6-triiodobenzoic acid and 850 ml. of dioxane was stirred and heated at reflux for about 30 minutes until solution was effected. Dry toluene (70 ml.) was added and 350 ml. of solvent was distilled off in order to remove any water azeotropically. At this point a suspension of 58 g. (0.235 mole) of β,β'-sulfonyl bis (propionyl chloride) (M.P. 131–133° C., from sulfonyldipropionic acid and thionyl chloride) in 250 ml. of dioxane was quickly added to the above refluxing suspension and 200 ml. more dioxane was used to wash the container. The solution was refluxed for six and a half days and was then seeded with a sample of the desired product from a previous preparation and refluxed for another three days. Dioxane (500 ml.) was removed by distillation, and the reaction mixture was refluxed overnight. The suspension was cooled to 20° C. and the light tan powdery solid, A, was collected by filtration and washed with approximately 200 ml. of fresh dioxane followed by 150 ml. of benzene. There was obtained 178 g. of almost colorless product, M.P. 260–264° C. (dec.). Solid A was combined with three other solids, which were obtained from a previous preparation of the same compound, to give a total of 263 g. of solid. The mixture was dissolved in 1000 ml. of water and enough 35% sodium hydroxide to give a solution of pH 7. The dark-brown solution was treated with approximately 2 g. of crushed calcium sulfate and 3 tablespoonsfuls of activated charcoal, and stirred for 10 minutes at room temperature. This mixture was filtered, the filtrate chilled at 10° C. for about 19 minutes, and the solution was stirred and acidified very slowly with 3 N hydrochloric acid to pH 2. At this point an amorphous solid precipitated. After chilling the suspension at 5° C. overnight, the solid, B, was collected by filtration, washed with 100 ml. of water, and allowed to drain well. Without drying further, B was dissolved in 700 ml. of water and 10% sodium hydroxide.

The solution was acidified very slowly with 3 N hydrochloric acid to a point where the color of the supernatant solution was very light, and the amorphous solid C was collected by filtration. The clear very pale yellow filtrate from C was further acidified with 3 N hydrochloric acid to pH 1 and stirred for 10 minutes. The solid was collected by filtration, washed with 50 ml. of cold water and dried to give 218 g. of 3,3′[(3,3′ - sulfonyldipropionyl)diimino]bis[2,4,6-triiodo-5 - (N - methylacetamido)benzoic acid], M.P. 254° C. (dec.).

3,3′-[(3,3′ - sulfonyldipropionyl)diimino]bis[2,4,6 - triiodo-5-(N-methylacetamido)benzoic acid] was also prepared by treating 3,3′ - [(3,3′ - thiodipropionyl)di - imino]bis[2,4,6-triiodo-5-(N - methylacetamido)benzoic acid] with m-chloroperbenzoic acid in dimethylformamide solution by the procedure described below in Example 15 (second paragraph).

EXAMPLE 15

3,3′[(3,3′ - sulfoxydipropionyl)diimino]bis[2,4,6 - triiodo - 5 - (N - methylacetamido)benzoic acid] [I; R is (CH₃CO)N(CH₃)-, X is SO, n is 2] was prepared from 25.44 g. of 3-amino-5-(N-methylacetamido)-2,4,6-triiodobenzoic acid and 5.01 g. of 3,3′-sulfoxydipropionyl chloride in 250 ml. of dioxane. The product was isolated by concentration of the reaction mixture.

Alternatively, the foregoing product can be obtained as follows: A solution of 4.55 g. (0.0230 mole) of 85% m-chloro-perbenzoic acid in 20 ml. of dimethylformamide was added over a period of 30 minutes to a solution of 30.0 g. (0.0228 mole) of 3,3′-[(3,3′-thiodipropionyl) diimino]bis[2,4,6-triiodo-5-(N - methylacetamido)benzoic acid] (Example 1) in 75 ml. of dimethylformamide at 15° C. The reaction mixture was allowed to stand for ten minutes and then poured into 300 ml. of water. The mixture was filtered and the filtrate acidified with 6 N hydrochloric acid. The solid product was collected, recrystallized from isopropyl alcohol and further purified by conversion to its sodium salt in aqueous solution and conversion back to the free acid, to give 3,3′-[(3,3′-sulfoxydipropionyl)diimino]bis[2,4,6-triiodo-5 - (N - methylacetamido)benzoic acid], M.P. 236–240° C.

EXAMPLE 16

N,N′ - bis[3 - (N - methylacetamido) - 5 - carboxy-2,4,6 - triiodophenyl] - 3′,8′ - dithiasebacamide [I; R is (CH₃CO)N(CH₃—, R′ and R″ are H, Y is

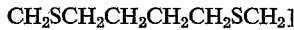
CH₂SCH₂CH₂CH₂CH₂SCH₂]

was prepared from 3-amino-5-(N-methylacetamido)-2,4,6-triiodobenzoic acid and 3′,8′-dithiasebacoyl chloride (Cl—COCH₂SCH₂CH₂CH₂CH₂SCH₂CO—Cl) according to the method described above in Example 1, and had the M.P. 241° C. (dec.).

EXAMPLE 17

3,3′ - [oxybis(ethylenethiomethylenecarbonylimino)]bis [2,4,6-triiodo-5-(N-methylacetamido)benzoic acid] [I; R is (CH₃CO)N(CH₃)—, R′ and R″ are H, Y is

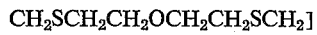
CH₂SCH₂CH₂OCH₂CH₂SCH₂]

colorless solid, M.P. 242.5° C. (dec.), was prepared from 3-amino-5-(N-methylacetamido)-2,4,6-triiodobenzoic acid and Cl—COCH₂SCH₂CH₂OCH₂CH₂SCH₂CO—Cl.

EXAMPLE 18

3,3′-[(3,3′ - sulfonyldipropionyl)diimino]bis[2,4,6-triiodo-5 - (N - ethylacetamido)benzoic acid] [II; R is (CH₃CO)N(C₂H₅)—, X is SO₂, n is 2], colorless solid, M.P. 249–254° C., was prepared from 3-amino-5-(N-ethylacetamido)-2,4,6-triiodobenzoic acid and 3,3′-sulfonyldipropionyl chloride.

EXAMPLE 19

3,3′ - [oxybis(ethylenethiomethylenecarbonylimino)]bis [5-(N-ethylacetamido)-2,4,6-triiodobenzoic acid] [I; R is (CH₃CO)N(C₂H₅)—, R′ and R″ are H, Y is

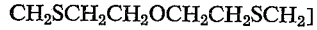
CH₂SCH₂CH₂OCH₂CH₂SCH₂]

pale beige solid, M.P. 246° C. (dec.), was prepared from 3-amino-5-(N-ethylacetamido)-2,4,6-triiodobenzoic acid and CH—COCH₂SCH₂CH₂OCH₂CH₂SCH₂CO—Cl.

EXAMPLE 20

3,3′- [(3,3-thiodipropionyl)diimino]bis[2,4,6-triiodo-5-(N-methyl-2-methoxyacetamido)benzoic acid] [I; R is (CH₃OCH₂CO)N(CH₃), R′ and R″ are H, Y is CH₂CH₂SCH₂CH₂], colorless solid, M.P. 258° C. (dec.), was prepared from 3-amino-2,4,6-triiodo-5-(N-methyl-2-methoxyacetamido)benzoic acid and 3,3′-thiodipropionyl chloride.

The intermediate 3-amino-2,4,6-triiodo-5-(N-methyl-2-methoxyacetamido)benzoic acid [III; R is (CH₃OCH₂CO)NH R″ is H], colorless solid, M.P. 245° C. (dec.) was prepared by reacting 3-amino-2,4,6-triiodo-5-(2-methoxyacetamido)benzoic acid with dimethyl sulfate in dilute sodium hydroxide.

EXAMPLE 21

3,3′ - [tetramethylenebis(sulfonylmethylenecarbonylimino)]bis[2,4,6 - triiodo - 5 - (N-methylacetamido)benzoic acid] [I; R is (CH₃CO)N(CH₃)—, R′ and R″ are H, Y is CH₂SO₂CH₂CH₂CH₂CH₂SO₂CH₂]

To a solution of 30.66 g. (0.0223 mole) of N,N′-bis [3 - (N-methylacetamido) - 5 - carboxy - 2,4,6 - triiodophenyl]-3′,8′-dithiasebacamide (Example 16) in 50 ml. of dimethylformamide at 33° C. was added a solution of 19.88 g. (0.0981 mole) of 85% m-chloroperbenzoic acid in 40 ml. of dimethylformamide during a 35 minute period, during which time the temperature of the mixture rose to 89° C. The reaction mixture was allowed to stand at room temperature for about sixteen hours, and then an additional 1 g. of m-chloroperbenzoic acid was added and the mixture stirred for one hour. The reaction mixture was added dropwise to 500 ml. of ethyl acetate with stirring. The solid product which separated was collected by filtration, and additional quantities obtained by concentration of the filtrate. The product was recrystallized from isopropyl alcohol and further purified by conversion to its sodium salt in aqueous solution and conversion back to the free acid, to give 3,3′-[tetramethylenebis (sulfonylmethylenecarbonylimino)]bis[2,4,6 - triiodo - 5 - (N-methylacetamido)benzoic acid], M.P. 273° C. (dec.).

EXAMPLE 22

3,3′-(diglycolyldiimino)bis[2,4,6 - triiodo - 5 - (N-ethylacetamido)benzoic acid] [II; R is

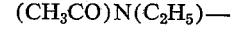
(CH₃CO)N(C₂H₅)—

X is O, n is 1] beige powder, M.P. 238–41° C., was prepared from 50.0 g. of 3-amino-2,4,6-triiodo-5-(N-ethylacetamido)benzoic acid and 7.35 g. of diglycolyl chloride.

EXAMPLE 23

3,3′-[thiodiacetyl)diimino]bis[2,4,6 - triiodo - 5 - (N-propylacetamido)benzoic acid] [II; R is

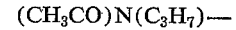
(CH₃CO)N(C₃H₇)—

X is S, n is 1], beige powder, M.P. 227–229° C., was prepared from 30.0 g. of 3-amino-2,4,6-triiodo-5-(N-propylacetamido)benzoic acid and 4.71 g. of thiodiacetyl chloride.

EXAMPLE 24

3,3′ - [(thiodiacetyl)diimino]bis[2,4,6 - triiodo - 5-(N-methylpropionamido)benzoic acid] [II; R is (CH₃CH₂CO)N(CH₃)—

X is S, n is 1], colorless solid, M.P. 273° C., was prepared from 3-amino-2,4,6-triiodo-5-(N-methylpropionamido)benzoic acid and thiodiacetyl chloride.

EXAMPLE 25

(a) 3-cyclopropylcarboxamido-5-nitrobenzoic acid

Cyclopropanecarboxylic acid chloride (57.5 g.) was added over a two minute period to a solution of 91 g. of 3-amino-5-nitrobenzoic acid in dioxane at 70° C. The reaction mixture was refluxed for about sixteen hours and the product isolated to give 89 g. of 3-cyclopropylcarboxamido-5-nitrobenzoic acid, M.P. 266–266.5° C.

(b) cyclopropylcarboxamido-5-aminobenzoic acid

A solution prepared from 89.5 g. of 3-cyclopropylcarboxamido-5-nitrobenzoic acid and 142 ml. of 2.5 N sodium hydroxide was hydrogenated in the presence of 3 g. of 10% palladium-on-carbon catalyst. The catalyst was removed by filtration and the filtrate acidified. The product was collected and dried to give 62.5 g. of 3-cyclopropylcarboxamido-5-aminobenzoic acid.

(c) 3-amino-5-(cyclopropylcarboxamido)-2,4,6-triiodobenzoic acid [III; R is (C₃H₅)CONH—, R″ is H]

To a solution of 62.1 g. of 3-cyclopropylcarboxamido-5-aminobenzoic acid and 95 ml. of 3 N hydrochloric acid in 750 ml. of water was added 330.5 ml. of 2.837 N aqueous sodium iodoodichloride solution over a period of 27 minutes. The reaction mixture was heated at about 100° C. for several days, and the product was isolated and recrystallized from an isopropyl alcohol-methanol mixture to give 3-amino-5-(cyclopropylcarboxamido)-2,4,6-triiodobenzoic acid, light tan solid, M.P. 224° C. (dec.).

(d) 3-amino-5-(N-methylcyclopropylcarboxamido)-2,4,6-triiodobenzoic acid [III; R is (C₃H₅)CON(CH₃)—, R″ is H]

A solution of 59.8 g. of 3-amino-5-(cyclopropylcarboxamido)-2,4,6-triiodobenzoic acid in 320 ml. of 10% sodium hydroxide solution was treated with 25.2 g. of dimethyl sulfate in 50 ml. of acetone. The product was isolated and purified by conversion to the sodium salt and back to the free acid, and by recrystallization from isopropyl alcohol, to give 3-amino-5-(N-methylcyclopropylcarboxamido)-2,4,6-triiodobenzoic acid, colorless solid, M.P. 268–271° C. (dec.).

(e) 3,3'-[(3,3'-thiodipropionyl)diimino]bis[2,4,6 - triiodo - 5 - (N - methylcyclopropylcarboxamido)benzoic acid] [II; R is (C₃H₅)CON(CH₃)—, X is S, n is 2], M.P. 251° C. (dec.) when recrystallized from dioxane-ethyl acetate, was prepared from 20.60 g. of 3-amino-5-(N-methylcyclopropylcarboxamido) - 2,4,6 - triiodobenzoic acid and 3.63 g. of thiodipropionyl chloride.

According to the procedures of the preceding example, cyclohexanecarboxylic acid chloride can be caused to react with 3-amino-5-nitrobenzoic acid and the resulting 3-cyclohexylcarboxamido-5-nitrobenzoic acid converted successively to 3-cyclohexylcarboxamido-5-aminobenzoic acid, 3-amino-5-(cyclohexylcarboxamido)-2,4,6-triiodobenzoic acid, 3-amino-5-(N-methylcyclohexylcarboxamido)-2,4,6-triiodobenzoic acid, and 3,3'-[(3,3'-thiodipropionyl)diimino]bis[2,4,6 - triiodo - 5 - (N-methylcyclohexylcarboxamido)benzoic acid].

I claim:
1. A compound of the formula

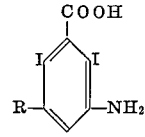

wherein R is (cycloalkylcarbonyl)NH or (cycloalkylcarbonyl)N(lower-alkyl), wherein cycloalkyl has from three to six ring members.

2. 3-amino - 5 - (cyclopropylcarboxamido) - 2,4,6 - triiodobenzoic acid, according to claim 1 wherein R is cyclopropylcarboxamido.

3. 3-amino - 5 - (N-methylcyclopropylcarboxamido)-2,4,6-triiodobenzoic acid, according to claim 1 wherein R is N-methylcyclopropylcarboxamido.

References Cited

UNITED STATES PATENTS

| 2,776,241 | 1/1957 | Priewe et al. | 167—95 |
| 3,020,145 | 2/1962 | Gobeil et al. | 71—2.6 |
| 3,047,466 | 7/1962 | Priewe et al. | |
| 3,306,927 | 2/1967 | Larsen | 260—471 |

OTHER REFERENCES

Fieser & Fieser: Organic Chemistry, 3rd ed. (1956), pp. 46–47.

LORRAINE A. WEINBERGER, Primary Examiner

E. J. GLEIMAN, Assistant Examiner

U.S. Cl. X.R.

260—470, 471, 501.11, 516, 519; 424—319

PO-1050
(5/69)

UNITED STATES PATENT OFFICE
CERTIFICATE OF CORRECTION

Patent No. 3,542,861        Dated November 24, 1970

Inventor(s) James H. Ackerman

It is certified that error appears in the above-identified patent and that said Letters Patent are hereby corrected as shown below:

Column 2, line 53, "3-amino-" should read --3-nitro--.

Column 3, line 55, "is, lower-" should read --is (lower-

Column 8, line 5, delete the line and insert in place thereof: --pared by reacting 3,3'-[(3,3'-thiodipropionyl)-diimino]bis- --.

Column 9, line 21, "I" should read --II--.

Column 10, line 9, "CH-" should read --Cl- --.

Column 11, line 10, "diozane" should read --dioxane--; line 30, "iododoichloride" should read --iododichloride--.

Column 12, Claim 1,

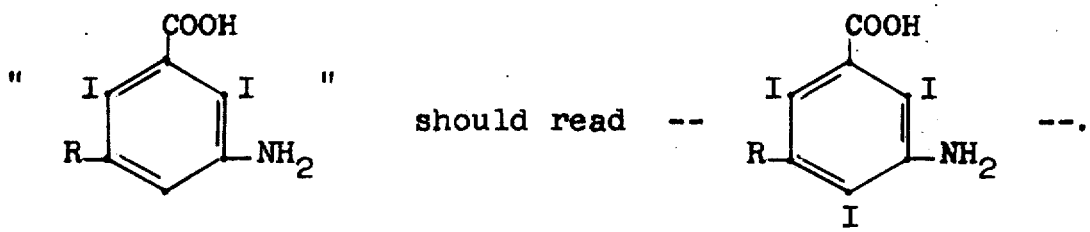

should read

Signed and sealed this 3rd day of August 1971.

(SEAL)
Attest:

EDWARD M. FLETCHER, JR.        WILLIAM E. SCHUYLER, JR.
Attesting Officer        Commissioner of Patents